UNITED STATES PATENT OFFICE.

MAX MOELLER AND CARL OELSCHLAEGEL, OF BERLIN, GERMANY, ASSIGNORS TO THE ACTIEN-GESELLSCHAFT FÜR ANILIN FABRIKATION, OF SAME PLACE.

BLACK AZO DYE.

SPECIFICATION forming part of Letters Patent No. 543,747, dated July 30, 1895.

Application filed March 23, 1895. Serial No. 542,980. (Specimens.)

*To all whom it may concern:*

Be it known that we, MAX MOELLER and CARL OELSCHLAEGEL, of Berlin, in the Kingdom of Prussia, German Empire, have invented new and useful Improvements in the Manufacture of Black Azo Dye; and we do hereby declare that the following is a full, clear, and exact description of the invention, which will enable others skilled in the art to which it appertains to make and use the same.

In the English specification No. 7,713 of 1891 coloring-matters are described which can be obtained by combining two molecular proportions of diazo compounds with one molecular proportion of the 1:8 amidonaphtholmonosulfonic acid, (acid I,) described in the specification No. 9,676, of 1890, or with one molecular proportion of the isomeric 1:8 amidonaphtholmonosulfo acid, (acid II,) which can be obtained by melting with a caustic alkali the naphthylamin disulfo acid prepared by sulfonating the naphthylamin monosulfonic acid S of the German Patent No. 40,571.

It is now known that the constitution of those two isomeric acids can be expressed by the following formula:

I 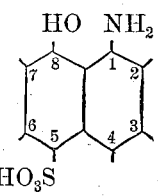     II 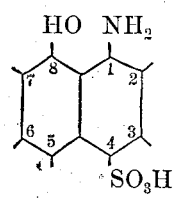

Diazo dye-stuffs which are derived from the first-mentioned acid (acid I) are also described in the United States Letters Patent No. 524,665, granted to Carl Bülow.

In the aforementioned English patent two directions are given according to which the new diazo dye-stuffs may be prepared. According to the first process the combination of two molecular proportions of a diazo compound with one molecular proportion of the amidonaphtholmonosulfonic acid is effected in a solution which is alkaline throughout. According to the second process, only the second combination is effected in alkaline solution, the first being effected in acid solution.

In the above-mentioned United States Letters Patent only the latter process is followed out. Neither the one or the other of these two processes is carried out as smoothly as is usually the case in preparing azo dyes, and this fact explains why coloring-matters prepared according to these processes have not hitherto, so far as is known, been brought into the market.

We have now discovered a new process before preparing diazo dyes from the $\alpha_1$ $\alpha_4$ amidonaphthol-$\alpha_2$ monosulfoacid, (acid II,) which in its main points shows very remarkable variations. According to our researches good results are only obtained when the second combination is performed in a weak-acid solution, and not, as is described in the patent above referred to, in an alkaline solution. This is of especial importance when two different molecules of a diazo compound are combined with one molecule of $\alpha_1$ $\alpha_4$ amidonaphthol-$\alpha_2$ monosulfoacid. If the combination be effected under these conditions it will come off very smoothly and the coloring-matters which are obtained are quite different from and superior to those described in the specification No. 7,713 of 1891.

In carrying out our invention practically, we may, for instance, proceed as follows: 1.5 kilos alpha-naphthylamin are converted in the well-known manner into diazonaphthalene, which solution is poured into an alkaline solution of twenty-four kilos of $\alpha_1$ $\alpha_4$ amidonaphthol-$\alpha_2$ monosulfonic acid. After the formation of the azo compound is completed, the whole is acidulated by means of acetic acid, and a solution of para-diazobenzenesulfonic acid is added, (obtained from 19.5 kilos of sulfanilic acid.) After the combination is completed the coloring-matter is separated out with salt, filtered off, and dried. It forms a brownish-black powder, readily soluble in water, only sparingly soluble in hot alcohol, and dyes wool in an acid bath a greenish-blue black.

If the combination with the same components be carried out under the conditions given in the specification No. 7,713 of 1891, the resulting coloring-matter will dye wool violet-blue tints.

Another special difference exists between the solutions of the two products in concentrated sulfuric acid. The solution of the coloring-matter prepared according to the process herein described is pure blue, and by diluting it with water a blue-black precipitate is formed, while the coloring-matter prepared according to the process described in the English specification above referred to dissolves in concentrated sulfuric acid with a blue-black color, and the precipitate formed by diluting with water is of a pronounced blue-violet color.

The dye-stuff derived from the isomeric amidonaphtholsulfo acid and described in the United States Letters Patent No. 524,665 dissolves in concentrated sulfuric acid with green color.

We finally mention that our dye is not destroyed by the further action of a diazo compound, but on the contrary under this condition yields a new dye forming the subject of a separate application.

As already stated, the essential point of our process consists in carrying out the second combination in acid solution. The first combination may also be effected in an acid solution, instead of an alkaline solution, as described above, the result being practically the same. We further may, without materially changing the character of the product, carry out the combination in the inverse way—that is to say, employ diazobenzenesulfoacid in the first place, alpha-diazonaphthalen in the second place.

Having now described our invention, what we claim is—

The black dye derived from $alpha_1$-$alpha_4$-amidonaphthol-$alpha_2$-monosulfonic acid by reacting upon this acid with alpha-diazonaphthalen and para-diazobenzenesulfonic acid substantially as herein set forth—said dye forming in dry state a brownish-black powder readily soluble in water sparingly soluble in alcohol, being not destroyed by further treatment with a diazo-compound, dissolving in concentrated sulfuric acid with pure blue color, from which solution on diluting with water the free color acid is precipitated in the shape of blue-black flakes.

In testimony whereof we hereunto set our hands and affix our seals, in the presence of two witnesses, this 9th day of March, A. D. 1895.

MAX MOELLER. [L. S.]
CARL OELSCHLAEGEL. [L. S.]

Witnesses:
OSCAR WEBER,
GUSTAV LUCHT.